US011487955B2

(12) United States Patent
Shin et al.

(10) Patent No.: US 11,487,955 B2
(45) Date of Patent: Nov. 1, 2022

(54) METHOD AND SYSTEM FOR PROVIDING TRANSLATION FOR CONFERENCE ASSISTANCE

(71) Applicant: NAVER CORPORATION, Seongnam-si (KR)

(72) Inventors: JoongHwi Shin, Seongnam-si (KR); Eunyoung Lee, Seongnam-si (KR); Doosun Yoo, Seongnam-si (KR); Hoon Choi, Seongnam-si (KR); Min Sik Park, Seongnam-si (KR); Jongwon Kim, Seongnam-si (KR); Bonghyun Choi, Seongnam-si (KR); Jeongmin Kim, Seongnam-si (KR)

(73) Assignee: NAVER CORPORATION, Seongnam-si (KR)

(*) Notice: Subject to any disclaimer, the term of this patent is extended or adjusted under 35 U.S.C. 154(b) by 0 days.

(21) Appl. No.: 17/022,946

(22) Filed: Sep. 16, 2020

(65) Prior Publication Data

US 2021/0374362 A1 Dec. 2, 2021

(30) Foreign Application Priority Data

May 27, 2020 (KR) .......................... 10-2020-0063672

(51) Int. Cl.
*G06F 40/58* (2020.01)
*G06F 40/166* (2020.01)
*G06F 3/0484* (2022.01)

(52) U.S. Cl.
CPC ............ *G06F 40/58* (2020.01); *G06F 3/0484* (2013.01); *G06F 40/166* (2020.01)

(58) Field of Classification Search
CPC ....................................................... G06F 40/58
See application file for complete search history.

(56) References Cited

U.S. PATENT DOCUMENTS

| 5,987,401 A * | 11/1999 | Trudeau .................. G06F 17/28 |
| 10,409,919 B2 * | 9/2019 | Rubin et al. ............ G06F 17/28 |
| 2011/0213607 A1 * | 9/2011 | Onishi ..................... G06F 17/28 |
| 2011/0246172 A1 * | 10/2011 | Liberman et al. ...... G06F 17/28 |
| 2014/0132701 A1 * | 5/2014 | Wang et al. ............. H04N 7/15 |
| 2016/0314116 A1 * | 10/2016 | Kamatani et al. ...... G06F 17/28 |
| 2018/0081875 A1 * | 3/2018 | Le et al. .................. G06F 17/28 |
| 2021/0014575 A1 * | 1/2021 | Selfors ............... H04N 21/4884 |

(Continued)

FOREIGN PATENT DOCUMENTS

| JP | 2001236347 A | 8/2001 |
| JP | 2015060458 A | 3/2015 |

(Continued)

OTHER PUBLICATIONS

Office Action issued by the Korean Patent Office corresponding to Korean patent application No. 10-2020-0063672, dated Jul. 26, 2021.

(Continued)

*Primary Examiner* — James J Debrow
(74) *Attorney, Agent, or Firm* — Greer Burns & Crain Ltd.

(57) ABSTRACT

A method and a system for conference assistance provide, as a conference assistance tool, a screen including an original text that is a text input in one of a plurality of languages set to be used in a conference and a translation text that is translated from the original text in another language.

14 Claims, 15 Drawing Sheets

(56) References Cited

U.S. PATENT DOCUMENTS

2021/0058356 A1* 2/2021 Karchov et al. ........ H04L 12/58
2021/0110120 A1* 4/2021 Zhang et al. ........... G06F 40/58

FOREIGN PATENT DOCUMENTS

| KR | 1020020002527 A | 1/2002 |
|---|---|---|
| KR | 100419801 B1 | 2/2004 |
| KR | 1020110133298 A | 12/2011 |
| KR | 1020150090357 A | 8/2015 |
| KR | 1020170063167 A | 6/2017 |

OTHER PUBLICATIONS

Office Action issued in corresponding Japanese patent application No. 2020-133029, dated Oct. 12, 2021.
V-Cube Meeting Foreign language conference; Jan. 12, 2018; URL: https://web.archive.org/web/20180112215916/https://jp.vcube.com/service/meeting/overview/howto/speechrecognition.
Zoom's Arecole Convenience Book; May 10, 2020; URL: https://web.archive.org/web/20200510103957/https://www.a.u-tokyo.ac.jp/wp-content/uploads/online_lectures/zoom_sugino.pdf.

* cited by examiner

| User1_KR | User2_JP |
|---|---|
| User3_KR | User4_JP |

METHOD AND SYSTEM FOR PROVIDING TRANSLATION FOR CONFERENCE ASSISTANCE

CROSS-REFERENCE TO RELATED APPLICATION

This U.S. non-provisional application claims the benefit of priority under 35 U.S.C. § 119 to Korean Patent Application No. 10-2020-0063672 filed on May 27, 2020, in the Korean Intellectual Property Office (KIPO), the entire contents of which are incorporated herein by reference.

BACKGROUND OF THE INVENTION

Field of Invention

One or more example embodiments of the following description relate to technology for a translation tool for conference assistance.

Description of Related Art

Videoconferencing is frequently used in a business environment and allows participants to share video and audio mutually in real time at geographically distributed locations.

As for a communication device of each of the users participating in such videoconferencing, a camera and a microphone are generally used to transmit video and audio, and a display and a speaker are used to play back the received video and audio.

Such videoconferencing accompanies digital compression of video and audio transmitted in real time over a network from a single location to at least one other location. Communication devices perform compression and decompression of video and audio and maintain data linkage through a network.

For example, a videoconferencing method using a multipoint signal control server is described in Korean Patent Registration No. 10-0419801, registered on Feb. 10, 2004.

BRIEF SUMMARY OF THE INVENTION

One or more example embodiments provide a method and a system that may use a basic mode for simultaneously displaying multilingual translation results and a subtitle mode for displaying translation results in a subtitle form through switching between the basic mode and the subtitle mode depending on necessity.

One or more example embodiments also provide a method and a system that may provide translation results of a main conference language together with translation results of a reference language.

One or more example embodiments also provide a method and a system that may provide translation results in a subtitle form on another application screen and may use the translation results as a conference assistance tool.

According to an aspect of at least one example embodiment, there is provided a translation providing method implemented by a computer apparatus including at least one processor configured to execute computer-readable instructions included in a memory, the method including, by the at least one processor, displaying, as a conference assistance tool, a screen including an original text that is a text input in one of a plurality of languages set to be used in a conference and a translation text that is translated from the original text in another language. A switching user interface (UI) for switching a screen mode is included in the screen.

The displaying of the screen may include displaying a basic mode for displaying the original text and the translation text together with a reference text translated in a third language different from the plurality of languages or a subtitle mode for displaying the original text and the translation text in a subtitle form, in response to a selection on the screen mode using the switching UI.

The displaying of the screen may include displaying the original text and the translation text together with a reference text translated in a third language different from the plurality of languages; and displaying the original text to be distinguished from the translation text and the reference text.

The displaying of the screen may include displaying the original text and the translation text together with a reference text translated in a third language different from the plurality of languages; and sorting and displaying the original text, the translation text, and the reference text by the same language.

The displaying of the original text and the translation text together with the reference text may include displaying the original text, the translation text, and the reference text together as a chat message for each user through a chatroom that includes a plurality of users participating in the conference; and sorting texts corresponding to a language used by a user of the computer apparatus among the plurality of languages in a first column.

The translation providing method may further include, by the at least one processor, switching to a subtitle mode screen for displaying the original text and the translation text in a subtitle form, in response to a selection on the screen mode using the switching UI.

The subtitle mode screen may include at least one of a UI for switching to another screen mode, a UI for fixing the subtitle mode screen to a foreground, a UI for adjusting the transparency of the subtitle mode screen, and a UI for adjusting the size of the subtitle mode screen.

The displaying of the screen may include displaying the original text and the translation text together as a chat message for each user through a chatroom that includes a plurality of users participating in the conference, and a modification UI for modifying a text with respect to an original text input from a user of the computer apparatus from the original text may be provided.

The displaying of the screen may include, in the case of the original text being modified through the modification UI, displaying status information according to a modification instead of an original text and a translation text that are not modified and, in response to a completion of the modification, displaying the modified original text and translation text.

The displaying of the screen may include, if the screen corresponds to a screen of a mobile version, displaying a text corresponding to a language used by a user of the computer apparatus from the original text and the translation text on the screen of the mobile version.

The displaying of the screen may include displaying an original text of a specific text in response to a selection from the user of the computer apparatus on the specific text among texts displayed on the screen of the mobile version.

The displaying of the screen may include displaying a reference text translated from a specific text in a third language different from the plurality of languages, in response to a selection from the user of the computer apparatus on the specific text among texts displayed on the screen of the mobile version.

The displaying of the screen may include displaying the original text and the translation text together as a chat message for each user through a chatroom that includes a plurality of users participating in the conference, and the translation providing method may further include, by the at least one processor, recording a minutes document file that includes the chat message for each user.

The recording of the minutes document file may include selecting a text corresponding to a language selected by a user of the computer apparatus from among the plurality of languages and recording the minutes document file as the chat message for each user.

According to another aspect of at least one example embodiment, there is provided a non-transitory computer-readable record medium storing computer instructions that, when executed by a processor, cause the processor to perform the translation providing method.

According to another aspect of at least one example embodiment, there is provided a computer apparatus including at least one processor configured to execute computer-readable instructions included in a memory. The at least one processor includes a translation display configured to display, as a conference assistance tool, a screen including an original text that is a text input in one of a plurality of languages set to be used in a conference and a translation text that is translated from the original text in another language, and a switching user interface (UI) for switching a screen mode is included in the screen.

According to some example embodiments, it is possible to enhance convenience and expandability by using a basic mode for simultaneously displaying multilingual translation results and a subtitle mode for displaying translation results in a subtitle form through switching between the basic mode and the subtitle mode depending on necessity.

Also, according to some example embodiments, it is possible to minimize an erroneous expression of opinion by occurrence of mistranslation by providing translation results of a main conference language together with translation results of a reference language.

Also, according to some example embodiments, it is possible to provide an efficient conferencing environment by providing translation results in a subtitle form on another application screen and by using the translation results as a conference assistance tool.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein:

FIG. 5 illustrates an example of a videoconferencing interface screen according to an example embodiment.

Figure 1:
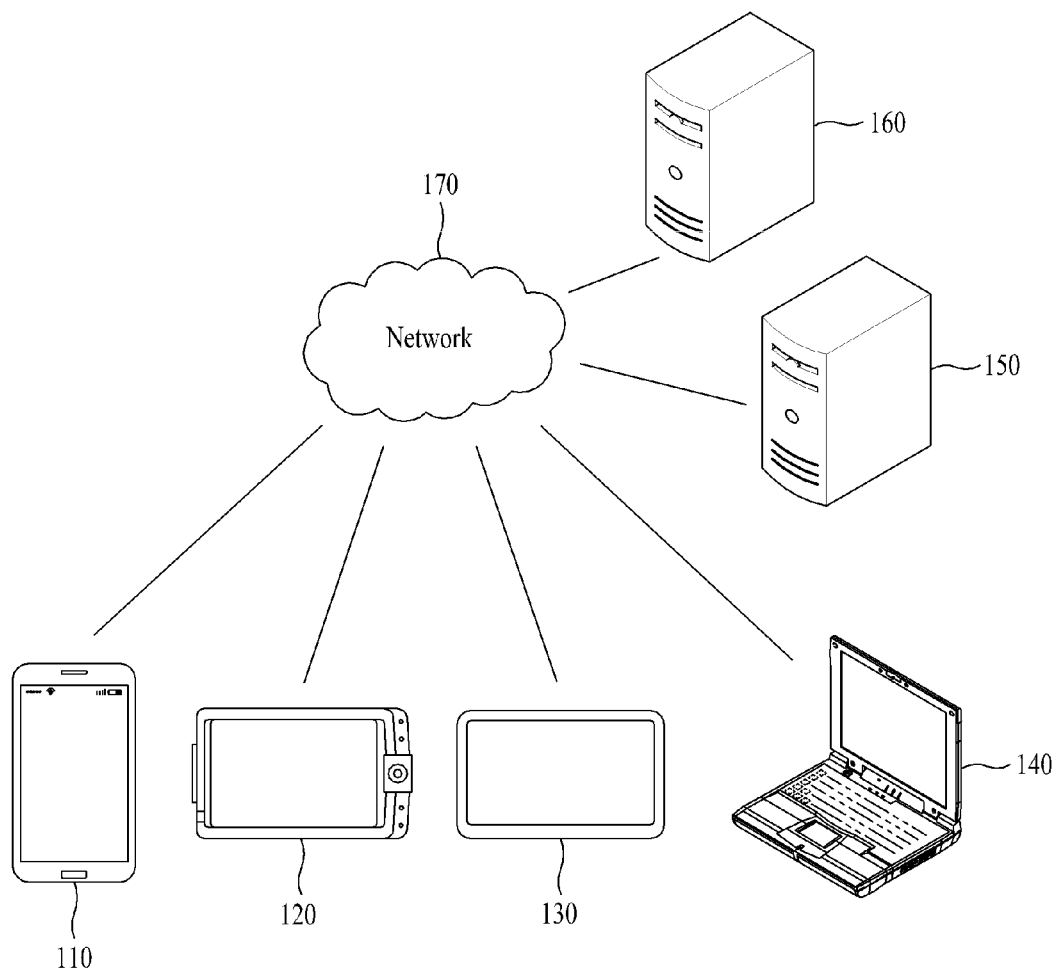
FIG. 1 illustrates an example of a network environment according to an example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. Computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

Example embodiments relate to technology for providing a translation tool for conference assistance.

The example embodiments including disclosures herein may provide a translation tool available in a conference in which users using various languages are present and may assist multilingual communication.

FIG. 1 is a diagram illustrating an example of a network environment according to an example embodiment. Referring to FIG. 1, the network environment includes a plurality of electronic devices 110, 120, 130, and 140, a plurality of servers 150 and 160, and a network 170. FIG. 1 is provided as an example only and thus, a number of electronic devices and/or a number of servers are not limited thereto.

Each of the plurality of electronic devices 110, 120, 130, and 140 may be a fixed terminal or a mobile terminal configured as a computer apparatus. For example, the plurality of electronic devices 110, 120, 130, and 140 may be a smartphone, a mobile phone, a navigation, a computer, a laptop computer, a digital broadcasting terminal, a personal digital assistant (PDA), a portable multimedia player (PMP), a tablet personal computer (PC), a game console, a wearable device, an Internet of things (IoT) device, a virtual reality (VR) device, an augmented reality (AR) device, and the like. For example, although FIG. 1 illustrates a shape of a smartphone as an example of the electronic device 110, the electronic device 110 may refer to one of various physical computer apparatuses capable of communicating with other electronic devices 120, 130, and 140, and/or the servers 150 and 160 over the network 170 in a wired communication manner or in a wireless communication manner.

The communication scheme is not particularly limited and may include a communication method using a near field communication between devices as well as a communication method using a communication network, for example, a mobile communication network, the wired Internet, the wireless Internet, a broadcasting network, a satellite network, etc., which may be included in the network 170. For example, the network 170 may include at least one of network topologies that include, for example, a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provides instructions, codes, files, contents, services, and the like through communication with the plurality of electronic devices 110, 120, 130, and 140 over the network 170. For example, the server 150 may be a system that provides a first service to the plurality of electronic devices 110, 120, 130, and 140 connected over the network 170, and the server 160 may be a system that provides a second service to the plurality of electronic devices 110, 120, 130, and 140 connected over the network 170. In detail, the server 150 may provide a service, for example, a translation service, of a corresponding application as the first service through the application as a computer program installed and executed on the plurality of electronic devices 110, 120, 130, and 140. As another example, the server 160 may provide a service for distributing a file for installing and executing the application to the plurality of electronic devices 110, 120, 130, and 140 as the second service.

Figure 2:
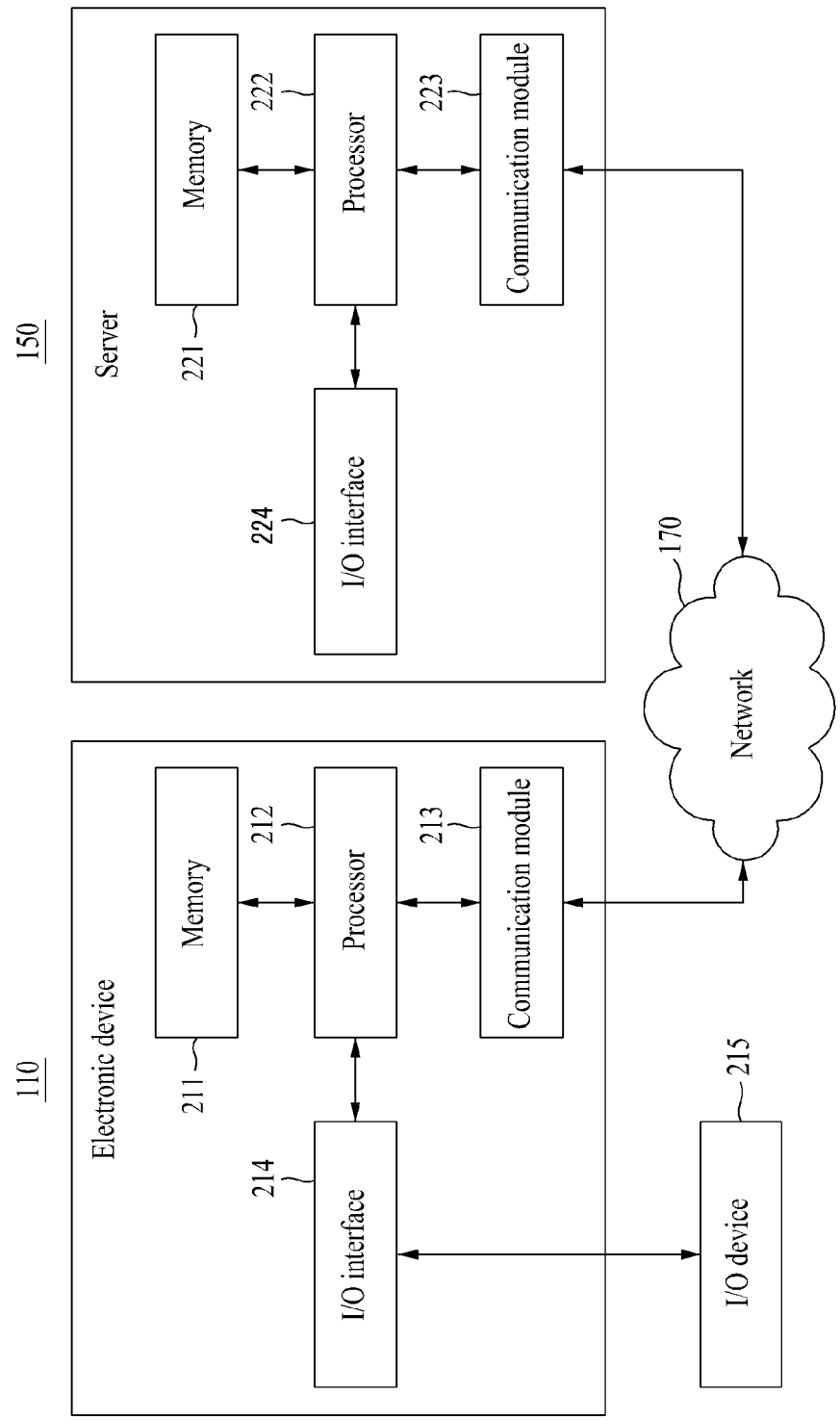
FIG. 2 illustrates an example of an electronic device and a server according to an example embodiment.

FIG. 2 is a block diagram illustrating an example of a configuration of an electronic device and a server according to an example embodiment. FIG. 2 illustrates a configuration of the electronic device 110 as an example for a single electronic device and illustrates a configuration of the server 150 as an example for a single server. Other electronic devices 120, 130, and/or 140, or the server 160 may have the same or similar components to those of the electronic device 110 or the server 150.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), a read only memory (ROM), a disk drive, a solid state drive (SSD), and a flash memory, as a non-transitory computer-readable storage medium. The permanent mass storage device, such as ROM, SSD, a flash memory, and a disk drive, may be included in the electronic device 110 or the server 150 as a permanent storage device separate from the memory 211, 221. Also, an OS or at least one program code, for example, a code for a browser installed and executed on the electronic device 110 or an application installed and executed on the electronic device 110 to provide a specific service, may be stored in the memory 211, 221. Such software components may be loaded from another non-transitory computer-readable storage medium separate from the memory 211, 221. The other non-transitory computer-readable storage medium may include a non-transitory computer-readable storage medium, for example, a floppy drive, a disk, a tape, a DVD/CD-ROM drive, a memory card, etc. According to other example embodiments, software components may be loaded to the memory 211, 221 through the communication module 213, 223, instead of, or in addition to, the non-transitory computer-readable storage medium. For example, at least one program may be loaded to the memory 211, 221 based on a computer program, for example, the application, installed by files provided over the network 170 from developers or a file distribution system, for example, the server 160, which provides an installation file of the application.

The processor 212, 222 may be configured to process computer-readable instructions of a computer program by performing basic arithmetic operations, logic operations, and I/O operations. The computer-readable instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device 110 and the server 150 over the network 170, and may provide a function for communication with another electronic device, for example, the electronic device 120, or another server, for example, the server 160. For example, the processor 212 of the electronic device 110 may transfer a request created based on a program code stored in the storage device, such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium, for example, the permanent storage device, further includable in the electronic device 110.

The I/O interface 214 may be a device for interfacing with an I/O device 215. For example, an input device of the I/O device 215 may include a device, such as a keyboard, a mouse, a microphone, and a camera, and an output device of the I/O device 215 may include a device, such as a display (e.g., a display panel or screen), a speaker, and a haptic feedback device. As another example, the I/O interface 214 may be a device for interfacing with an apparatus in which an input function and an output function are integrated into a single function, such as a touchscreen. The I/O device 215 may be configured as a single device with the electronic device 110. Also, the I/O interface 224 of the server 150 may be a device for interfacing with an apparatus (not shown) for input or output that may be connected to the server 150 or included in the server 150. In detail, when the processor 212 of the electronic device 110 processes an instruction of the computer program loaded to the memory 211, content or a service screen configured using data provided from the server 150 or the electronic device 120 may be displayed on a display through the I/O interface 214.

According to other example embodiments, the electronic device 110 and the server 150 may include a number of components greater than or less than the number of components shown in FIG. 2. However, there is no need to clearly illustrate components that are conventional in the related art. For example, the electronic device 110 may include at least a portion of the I/O device 215, or may further include other components, for example, a transceiver, a global positioning system (GPS) module, a camera, a variety of sensors, a database (DB), and the like.

Hereinafter, a method and system for providing a translation for conference assistance according to example embodiments is described.

Figure 3:
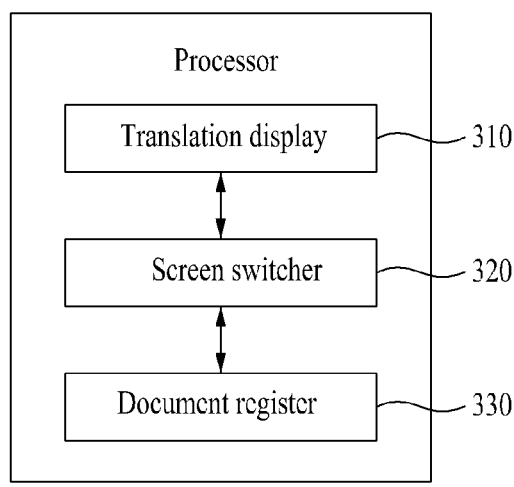
FIG. 3 illustrates an example of components includable in a processor of an electronic device according to an example embodiment.
Figure 4:
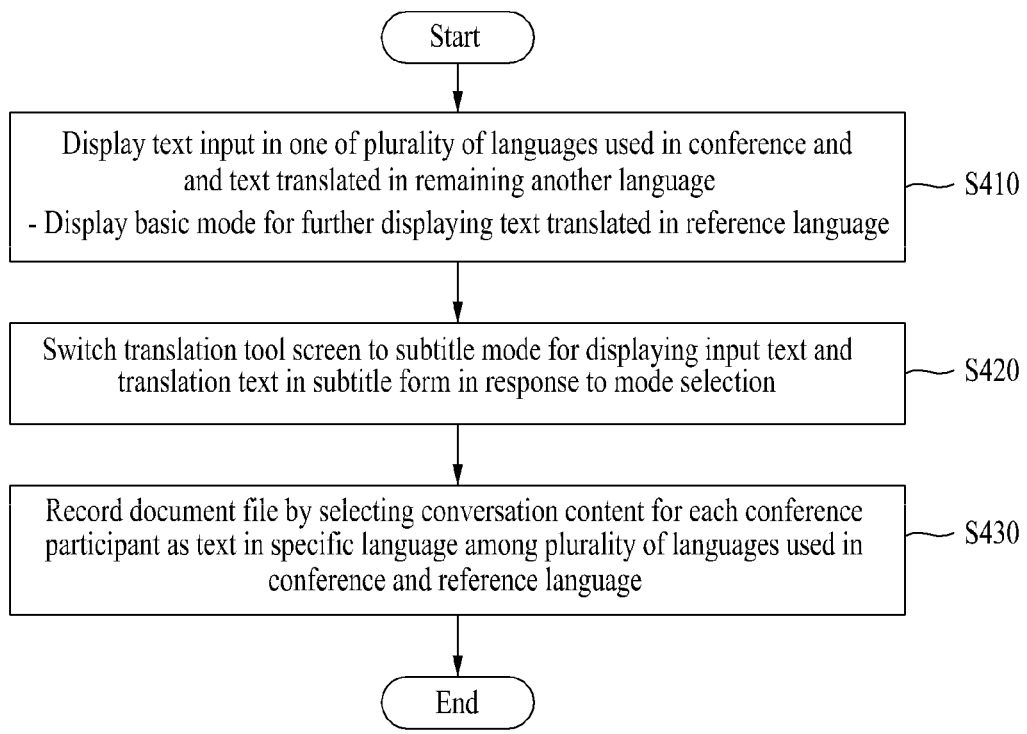
FIG. 4 is a flowchart illustrating an example of a method performed by an electronic device according to an example embodiment.

FIG. 3 illustrates an example of components includable in the processor 212 of the electronic device 110 according to an example embodiment, and FIG. 4 is a flowchart illustrating an example of a method performed by the electronic device 110 according to an example embodiment.

A computer implemented translation providing system may be configured on the electronic device 110 according to the example embodiment. For example, the translation providing system may be configured in a form of a program that independently operates, or may be configured in an in-app form of a specific application, for example, a videoconferencing system to be operable on the specific application, and may provide a translation service through interaction with the server 150 depending on cases.

The translation providing system configured on the electronic device 110 may perform a translation providing method of FIG. 4 in response to an instruction provided from the application installed on the electronic device 110.

Referring to FIG. 3, to perform the translation providing method of FIG. 4, the processor 212 of the electronic device 110 may include a translation display 310, a screen switcher 320, and a document register 330. Depending on example embodiments, the components of the processor 212 may be selectively included in or excluded from the processor 212. Also, depending on example embodiments, the components of the processor 212 may be separated or merged for representations of functions of the processor 212.

The processor 212 and the components of the processor 212 may control the electronic device 110 to perform operations S410 to S430 included in the translation providing method of FIG. 4. For example, the processor 212 and the components of the processor 212 may be configured to execute an instruction according to a code of at least one program and a code of an OS included in the memory 211.

Here, the components of the processor 212 may be representations of different functions of the processor 212 performed by the processor 212 in response to an instruction provided from a program code stored in the electronic device 110, for example, an instruction provided from the application executed on the electronic device 110. For example, the translation display 310 may be used as a functional representation of the processor 212 to control the electronic device 110 to display translation results in response to the instruction.

The processor 212 may read a necessary instruction from the memory 211 to which instructions associated with control of the electronic device 110 are loaded. In this case, the read instruction may include an instruction to control the processor 212 to perform the following operations S410 to S430.

Referring to FIG. 4, in operation S410, the translation display 310 may control the electronic device 110 to display through the I/O device 215 a text (hereinafter, an original text) input in a single language among a plurality of languages set to be used as a language, that is, a main conference language, by conference participants in a conference and a text (hereinafter, a translation text) translated in another language. The original text refers to an original text input in a language used by each corresponding conference participant and the translation text refers to a text that is translated from the original text in the language used by another conference participant. The translation display 310 may display an original text and a translation text received from the server 150 through a chatroom that includes users (conference participants) participating in an online videoconference or an offline videoconference.

The example embodiments provide a translation tool used for conference assistance. Here, the translation tool may be used as an auxiliary tool of an offline conference as well as an online conference, without being subject to a videoconferencing system. Depending on example embodiments, the translation tool may be included in a videoconferencing system associated with the server 150.

The translation tool according to one example embodiment may be software modules which may be stored in the memory 211 of the electronic device 110 and cause the processor 212 to perform functions according to the instructions in the software modules. In operation, the translation tool may enable the electronic device 110 to receive a voice input of a user through the I/O interface 214 as a voice recognition-based system. For example, the electronic device 110 may receive a voice input of the user through a chat-based interface. For example, the electronic device 110 may receive a voice input according to an utterance of the user through a voice input device, such as a microphone included in the electronic device 110 or a microphone interacting with the electronic device 110, as the chat-based interface.

The translation tool may include instructions for receiving a voice input and for displaying translation results for the voice input. Here, the translation tool may include a mobile version and a PC version. For an accurate voice input, an input device for receiving a voice input may be separated from a display device for displaying translation results using the mobile version and the PC version. For example, the translation tool of the mobile version installed on a smartphone, a wearable device, etc., may be used as a voice input device and the translation tool of the PC version installed on a computer, a laptop computer, a PC, etc., may be used as a main display device.

Although the example embodiment is described to provide translation results by recognizing uttered voice, it is provided as an example. In addition to the voice input, any type of inputs, such as a text input, an optical character reader (OCR) recognition, etc., may be included.

The server 150 may provide a messaging service associated with the translation tool and may support a chatroom for sharing multilingual translation results. Each conference participant may select a language to use and then participate in a chatroom that includes conference participants and speak in the selected language by pressing a microphone button in the chatroom.

The translation tool may simultaneously display voice recognition results and results translated in a language of another user with respect to uttered voice of a single user that is a conference participant in a conferencing environment using multiple languages. The server 150 may receive a voice input according to an utterance of a conference participant and, for the received voice input, may provide voice recognition results as an original text and also provide a translation text translated in a language used by another conference participant.

Further, the server 150 may additionally provide a text (hereinafter, a reference text) translated in a third language from any of the languages used by the conference participants, and set the text as a reference language aside from the languages used by the conference participants, that is, the main conference languages. To minimize an erroneous expression of opinion by occurrence of mistranslation, a translation text of a third language may be provided as a referable auxiliary translation. The third language is set as a language different from the languages used by the conference participants. A common default language may be used as a third language with respect to all of the users. As another example, a language selected by each user may be set for each user as a customizing setting.

The translation display 310 may display multilingual translation results on a screen of a chatroom that includes conference participants as a translation tool screen. Here, the translation display 310 may display the multilingual translation results in a basic mode for displaying the original text, the translation text, and the reference text together.

In operation S420, the screen switcher 320 may switch the translation tool screen from the basic mode to the subtitle mode in response to a screen mode selection. The translation tool screen may include a switching user interface (UI) for switching a screen mode depending on necessity. Here, the screen mode may include the basic mode for displaying the original text, the translation text, and the reference text together, and the subtitle mode for displaying the original text and the translation text in a subtitle form aside from the reference text. The screen switcher 320 may switch a screen between the basic mode and the subtitle mode in response to the mode selection using the switching UI.

In operation S430, the document register 330 may record multilingual translation results in a document file form as a minutes download function. Herein, since a conference participant (utterer) is clearly identified in a voice input operation by identifying a user through a chatroom, minutes may be downloaded in a form of conversation content for each conference participant. The document register 330 may record a document file by selecting the conversation content for each conference participant as a text in a specific language among a plurality of languages used in a conference and a reference language. For example, the document register 330 may download a text in a language selected by the user of the electronic device 110 from the multilingual translation results with respect to the conversation content for each conference participant and may record the downloaded text as a minutes document file. Here, the document register 330 may download and record the minutes document file in a file format selected by the user of the electronic device 110.

Hereinafter, example embodiments of a translation tool for conference assistance are further described.

Figure 5:
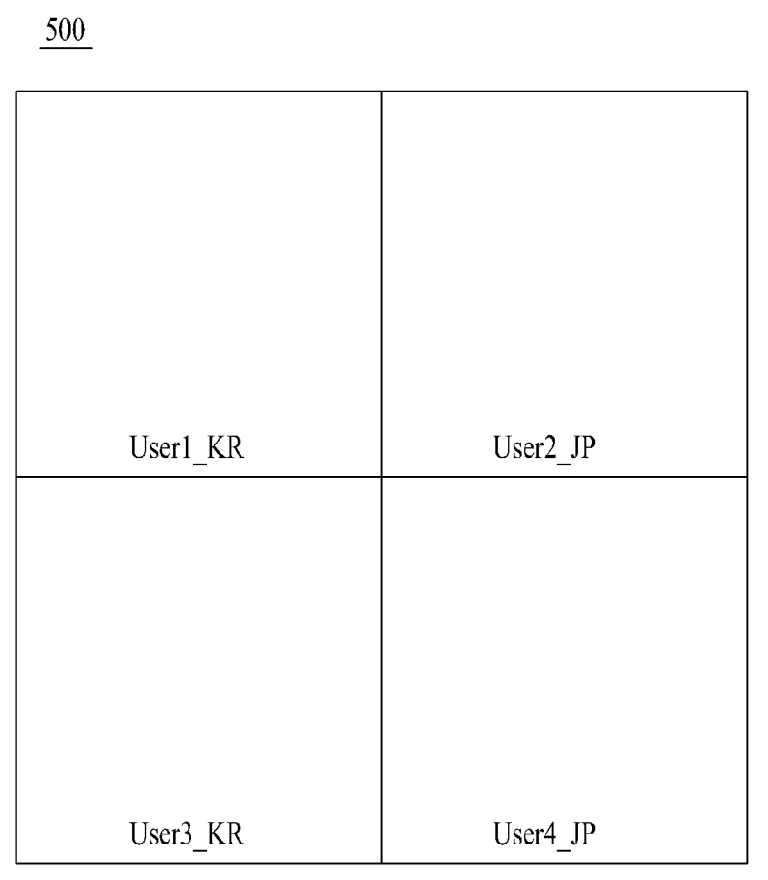

FIG. 5 illustrates an example of a videoconferencing interface screen 500 shown on a display of the I/O device 215. Here, it is assumed that user 1 and user 3 use Korean (KR) and user 2 and user 4 use Japanese (JP) in a videoconferencing environment in which four users are present.

Separate from a videoconferencing environment, each of the user 1 to the user 4 participating in a videoconference executes a translation tool of a mobile version and a translation tool of a PC version on different two electronic devices, and uses the mobile version as an input device and uses the PC version as a main display device. The user 1 to the user 4 participate in a chatroom created on the translation tool. Here, a language used by the user 1 and the user 3 is set as Korean (KR) and a language used by the user 2 and the user 4 is set as Japanese (JP) with respect to a main conference language in the created chatroom on the PC version.

A reference language is set as a third language, for example, English (US), aside from Korean (KR) and Japanese (JP).

FIGS. 6 to 15 illustrate examples of a translation tool interface screen according to example embodiments.

Figure 6:
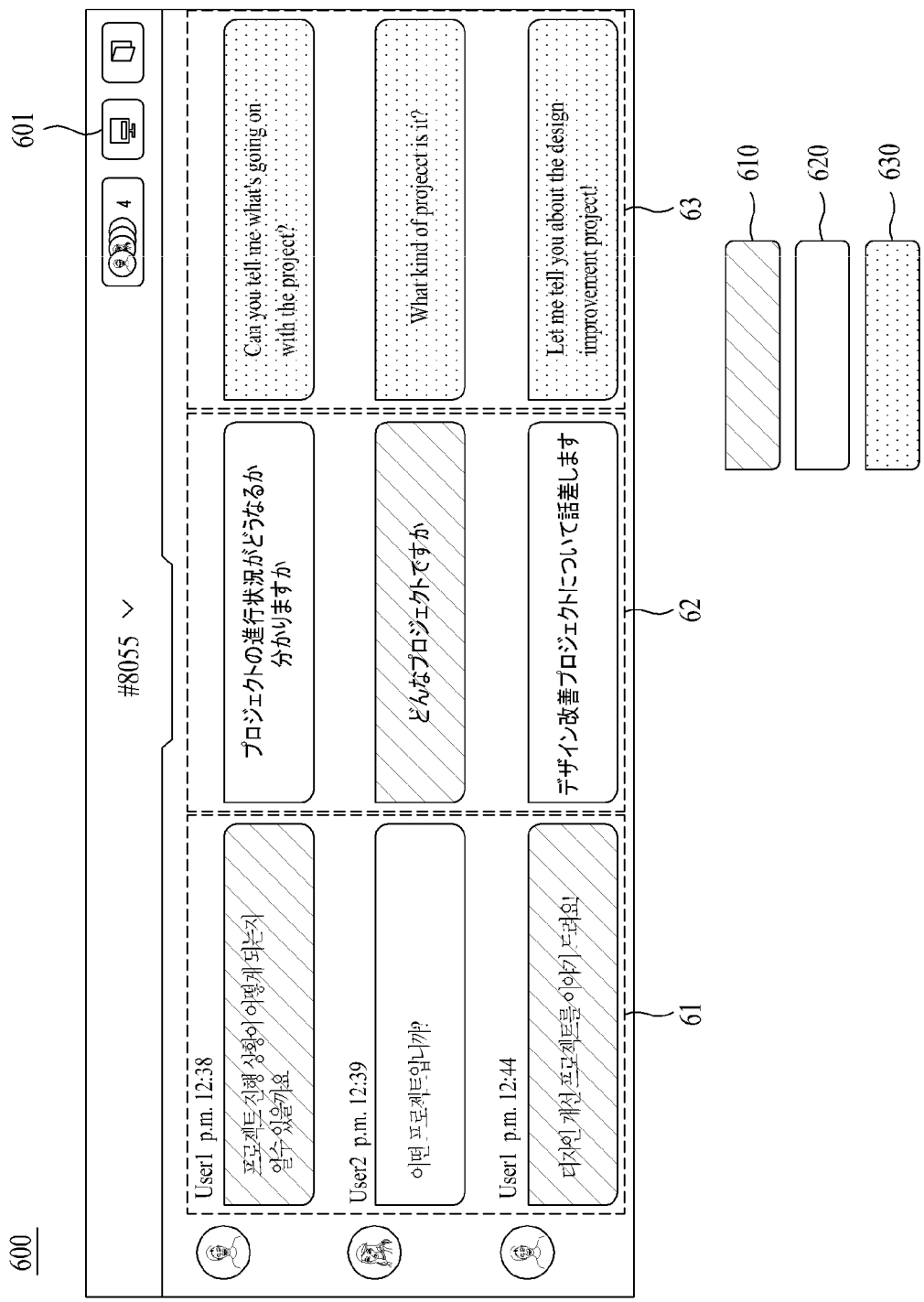
FIGS. 6 to 15 illustrate examples of a translation tool interface screen according to an example embodiment.

FIG. 6 illustrates an example of a basic mode screen 600 as an example of a translation tool screen of a PC version.

Referring to FIG. 6, the processor 212 may display a chatroom screen on the I/O device 215 that includes conference participants, for example, users 1 to 4, as a translation tool screen. Here, conversation content for each conference participant may be displayed as a basic mode for displaying an original text 610, a translation text 620, and a reference text 630 together.

The processor 212 may display the reference text 630 such that the conference participants may refer to a translation in a third language in addition to main conference languages, that is, Korean and Japanese, set as languages used in a conference. The processor 212 may display each of the original text 610, the translation text 620, and the reference text 630 in a form of a speech balloon that represents an individual message.

The processor 212 may sort and display the original texts 610, the translation texts 620, and the reference texts 630 in the same column by the same language. For example, the processor 212 may group and thereby display the original texts 610, the translation texts 620, and the reference texts 630 in a KR column 61, a JP column 62, and a US column 63, respectively. When the basic mode screen 600 is a translation tool screen displayed on an electronic device 110 of the user 1, texts corresponding to the language (KR) used by the user 1 may be sorted in the first column and texts of the reference language may be sorted in the last column. On a translation tool screen displayed on an electronic device of the user 2, texts corresponding to the language (JP) used by the user 2 may be sorted in the first column.

The processor 212 may display the original text 610 among the original text 610, the translation text 620, and the reference text 630 with improved readability to be distinguished from other texts. The processor 212 may highlight a speech balloon representing the original text 610 or may apply, to letters and a speech balloon, a color different from that of the other texts.

The processor 212 may differently mark the original text 610 among the original text 610, the translation text 620, and the reference text 630, or may differently mark each of the original text 610, the translation text 620, and the reference text 630 depending on example embodiments.

The basic mode screen 600 may include a mode switch button 601 for switching to a subtitle mode.

Figure 7:
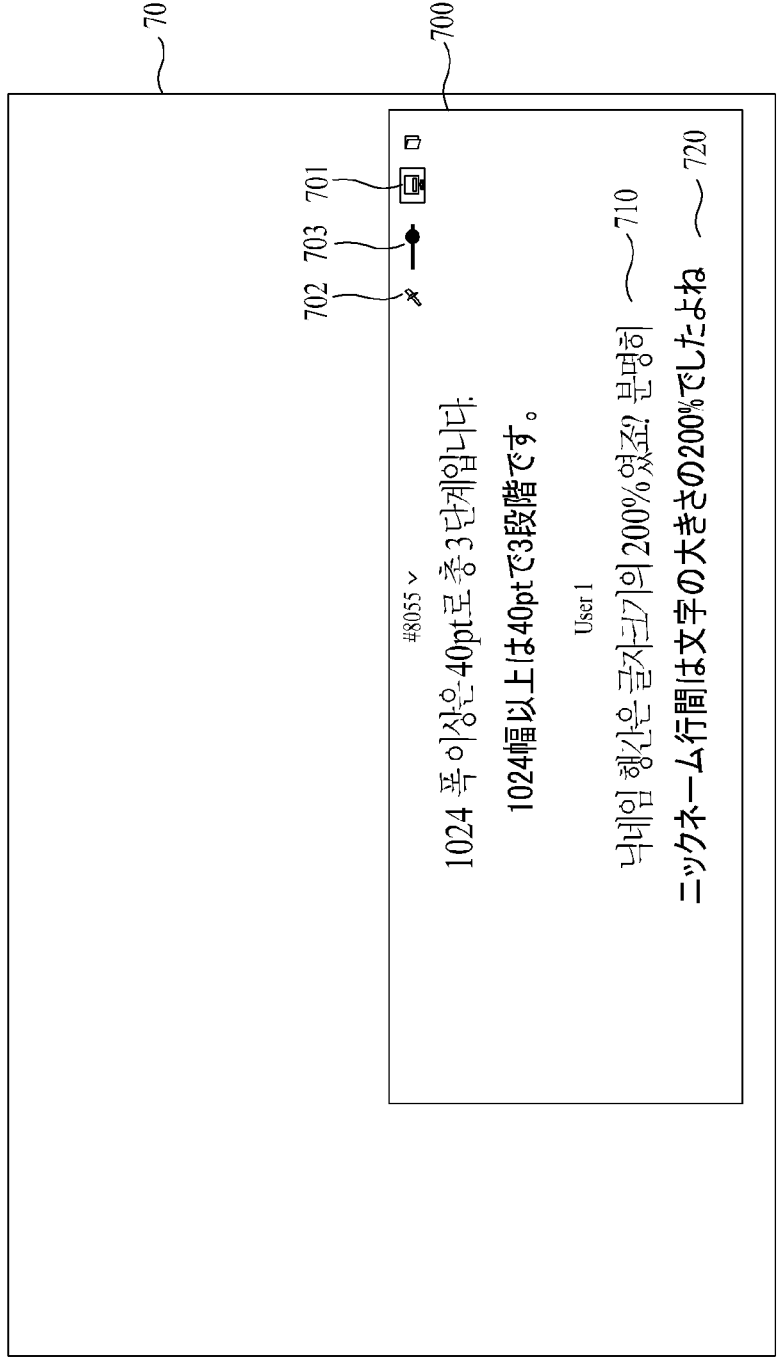

FIG. 7 illustrates an example of a subtitle mode screen 700.

Referring to FIG. 7, the basic mode screen 600 may be switched to the subtitle mode screen 700 in response to an input of the mode switch button 601 on the basic mode screen 600. The subtitle mode screen 700 refers to a screen mode for displaying an original text 710 and a translation text 720 corresponding to conversation content for each conference participant in a subtitle form, i.e., displayed in a region (e.g., the bottom) on the foreground of the screen.

A reference text may be omitted on the subtitle mode screen 700.

The subtitle mode screen 700 may be displayed with another application screen 70 used during a conference and be used as a conference assistance tool. For example, the subtitle mode screen 700 may be overlaid on the other application screen 70.

The processor 212 may sequentially display the original text 710 and the translation text 720 based on a column unit as conversation content for each conference participant. When the subtitle mode screen 700 is a translation tool screen displayed on the electronic device 110 of the user 1, a text corresponding to the language (KR) used by the user 1 may be initially displayed and a text corresponding to the other language (JP) may be subsequently displayed.

The subtitle mode screen 700 may provide various additional functions to be used with the other application screen 70 used during the conference. For example, the subtitle mode screen 700 may include a mode switch button 701 for switching to a basic mode, a screen fixing button 702 for fixing a screen, and a transparency adjustment button 703 for adjusting a screen transparency.

In response to an input of the mode switch button 701 on the subtitle mode screen 700, the subtitle mode screen 700 may be switched to the basic mode screen 600 of FIG. 6.

If a corresponding screen is set to a fixed state through the screen fixing button 702, the processor 212 may fix a layer corresponding to the subtitle mode screen 700 to be located on a foreground at all times regardless of execution of another application.

In response to a manipulation using the transparency adjustment button 703, the processor 212 may adjust the degree or level of transparency of the subtitle mode screen 700. If the subtitle mode screen 700 is displayed on the other application screen 70, the processor 212 may adjust the transparency of the subtitle mode screen 700 such that the subtitle mode screen 700 and the other application screen 70 laid below the subtitle mode screen 700 may be viewed together.

Figure 8:
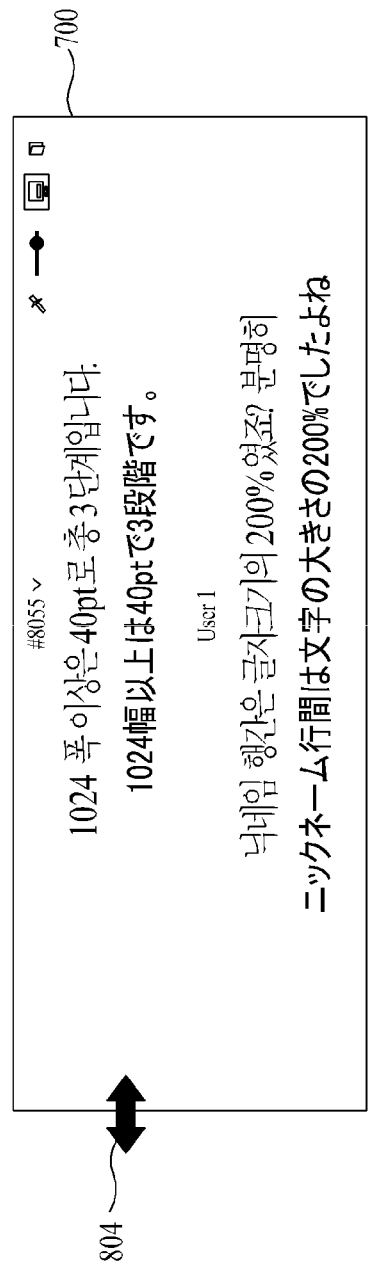

Referring to FIG. 8, in response to a cursor being located at an edge of the subtitle mode screen 700, the corresponding cursor may be converted to a size adjustment UI 804 for adjusting the size of the subtitle mode screen 700. Using the size adjustment UI 804, a user may adjust the size of the subtitle mode screen 700 to a desired size. Here, a font size on the subtitle mode screen 700 may be automatically adjusted to fit the size of the subtitle mode screen 700.

The example embodiment may provide a modification function for an original text.

Figure 9:
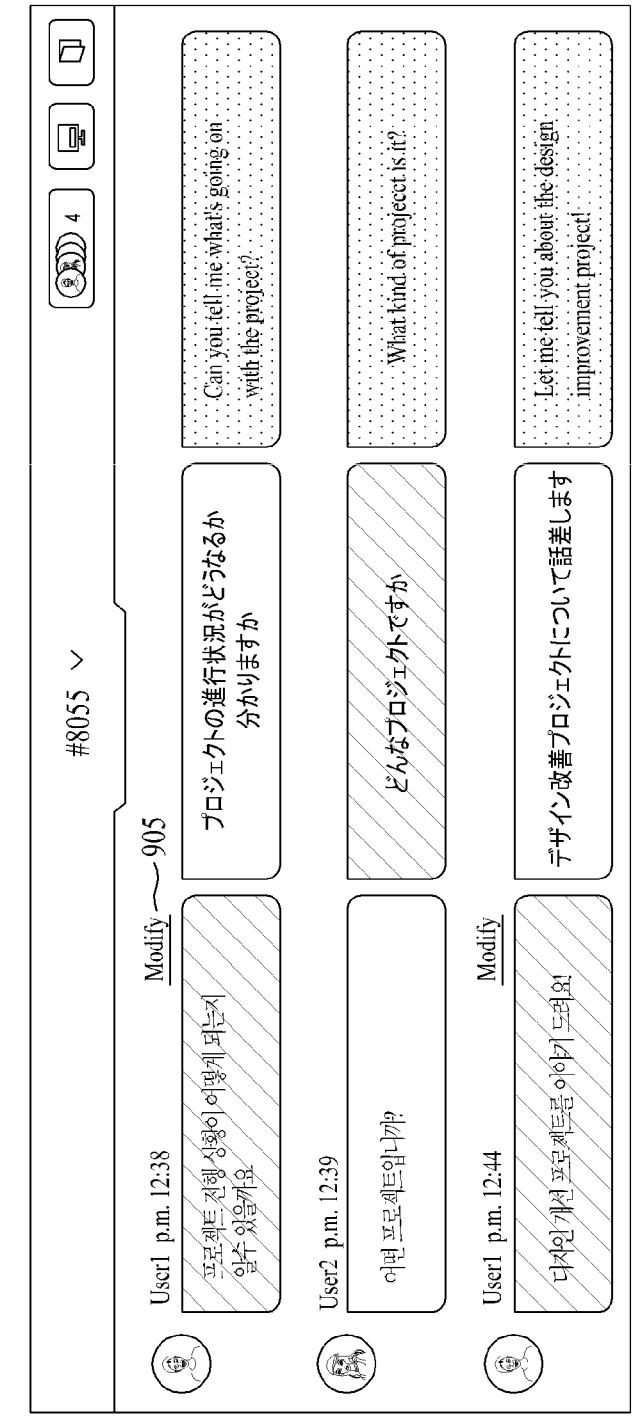

Referring to FIG. 9, the processor 212 may provide a modification button 905 for modifying or editing a corresponding text with respect to each original text input from the user of the electronic device 110 as a conference participant.

Figure 10:
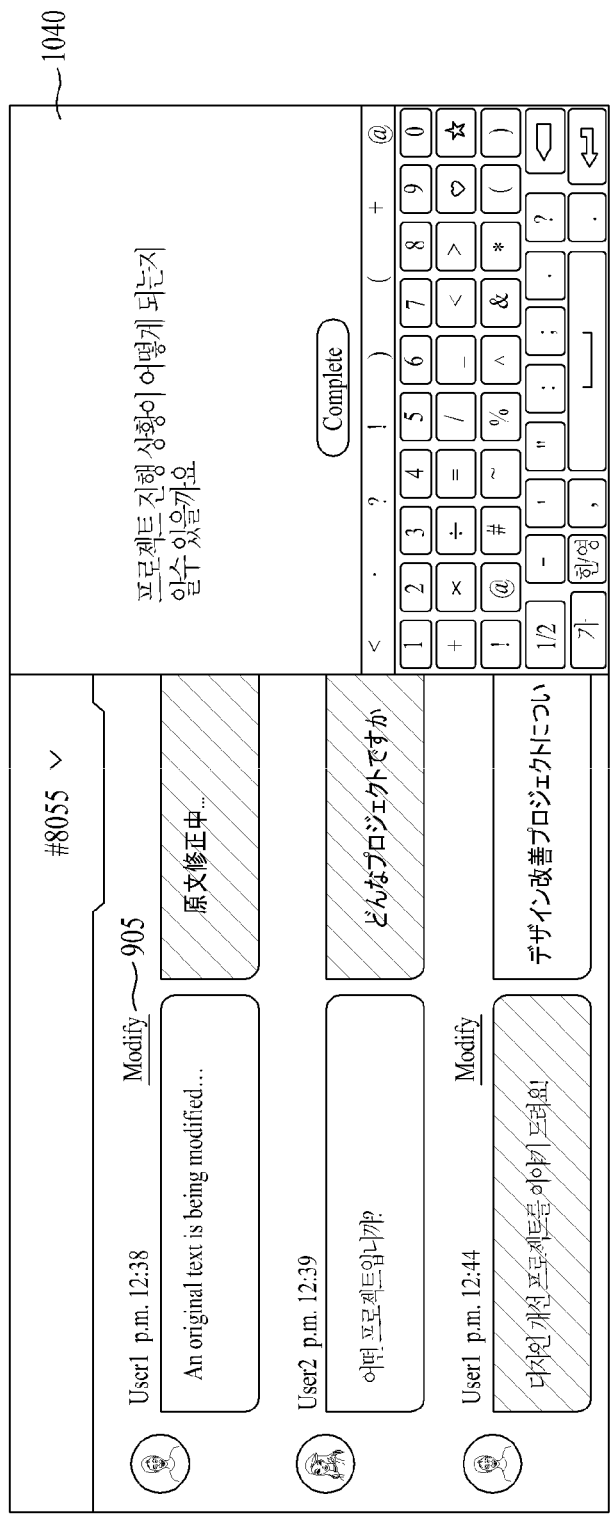

Referring to FIG. 10, in response to a selection on the modification button 905 on the basic mode screen 600, the processor 212 may provide a text modification screen 1040 including a keyboard such that the user may modify a corresponding original text. Original text content selected through the modification button 905 may be automatically input to the text modification screen 1040 and functions capable of modifying an input text may be included in the text modification screen 1040.

While the original text is being modified immediately after the modification button 905 is selected, the original text and the translation text that are not modified may disappear and status information (e.g., a message representing "The original text is being modified") according to the modification may be displayed on the basic mode screen 600 on the side of all of the conference participants.

Once the modification of the original text is completed, the original text and the translation text before the modification may be converted to the modified original text and translation text and the modified original text and translation text may be displayed.

Figure 11:
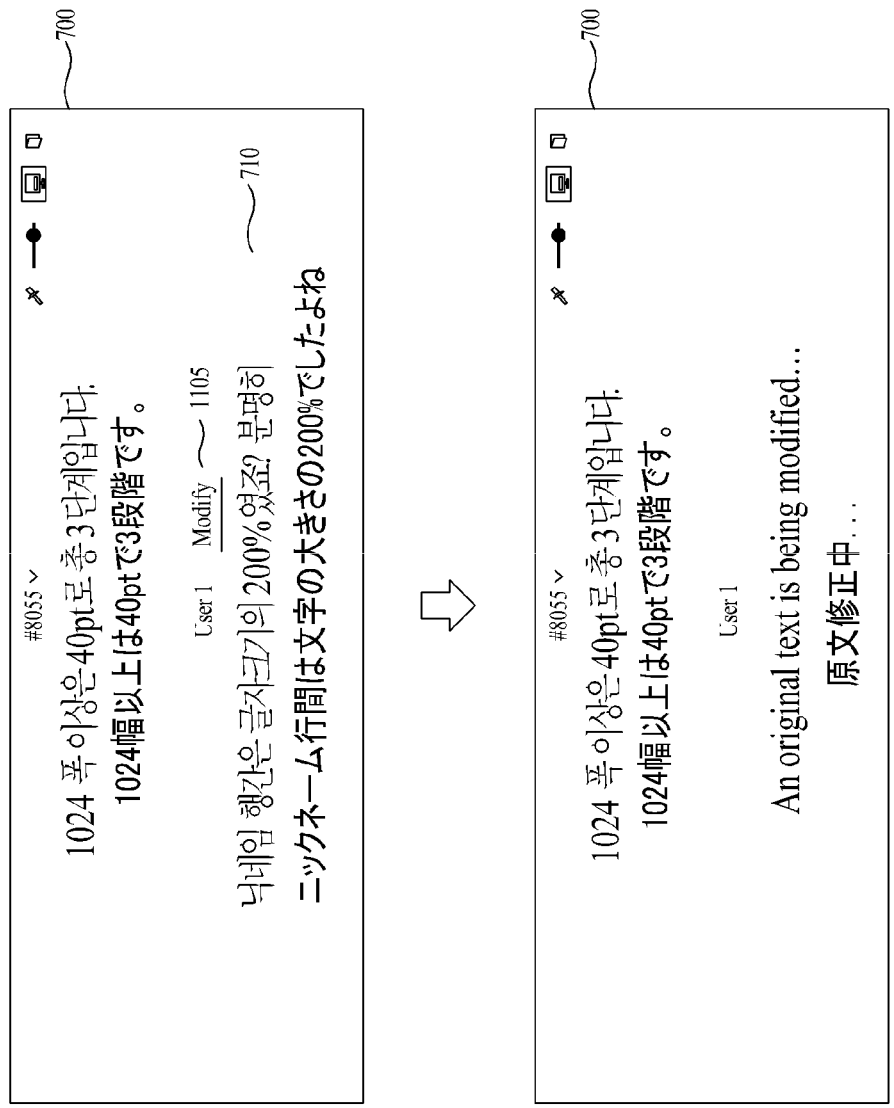

Referring to FIG. 11, even on the subtitle mode screen 700, the processor 212 may provide a modification button 1105 for modifying the original text 710 input from the user of the electronic device 110. While the original text 710 is being modified using the modification button 1105, status information (e.g., a message representing "An original text is being modified") according to the modification may be displayed on the subtitle mode screen 700 on the side of all of the conference participants, instead of not-modified original text and translation text.

Therefore, a translation tool according to example embodiments may allow a conference participant himself or herself to modify the original text input from the conference participant regardless of occurrence of a voice input error or a voice recognition error. By displaying status information instead of a not-modified original text and translation text during the modification of the original text, it is possible to minimize an erroneous expression of opinion.

Although a modification function in a translation tool of a PC version is described above, it is provided as an example only. The following translation tool of a mobile version may also include the modification function.

FIGS. 12 to 15 illustrate examples of a translation tool screen of a mobile version.

When the electronic device 110 is a mobile device having a small screen size, such as a smartphone, the electronic device 110 may display conversation content for each conference participant only as a text in a language set by the user of the electronic device 110.

Figure 12:
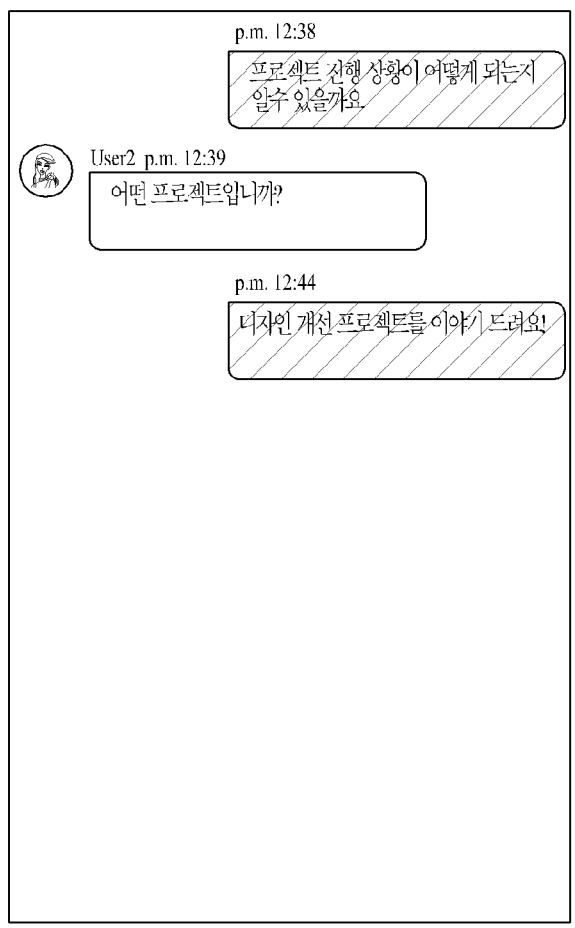
Figure 13:
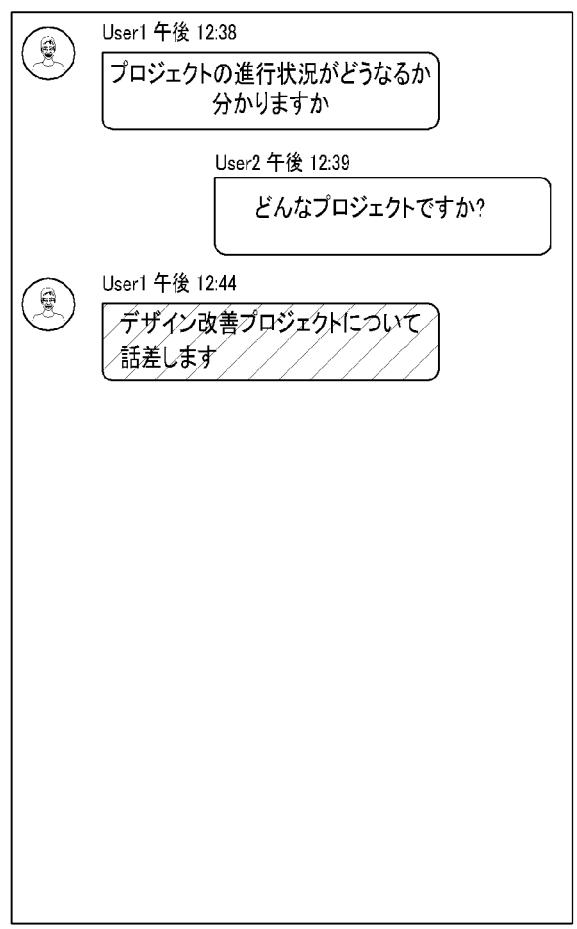

FIG. 12 illustrates an example of a translation tool screen 1200 of a mobile version displayed on an electronic device of the user 1 having set Korean (KR) as a language used in a conference and FIG. 13 illustrates an example of a translation tool screen 1300 of a mobile version displayed on an electronic device of the user 2 having set Japanese (JP) as a language used in the conference.

Referring to FIGS. 12 and 13, during the conference, conversation content may be displayed as Korean texts on the Korean user side and may be displayed as Japanese texts on the Japanese user side.

Even on the translation tool screen 1200, 1300 of the mobile version, the conversation content for each conference participant may be displayed in a form of a speech balloon representing an individual message.

Figure 14:
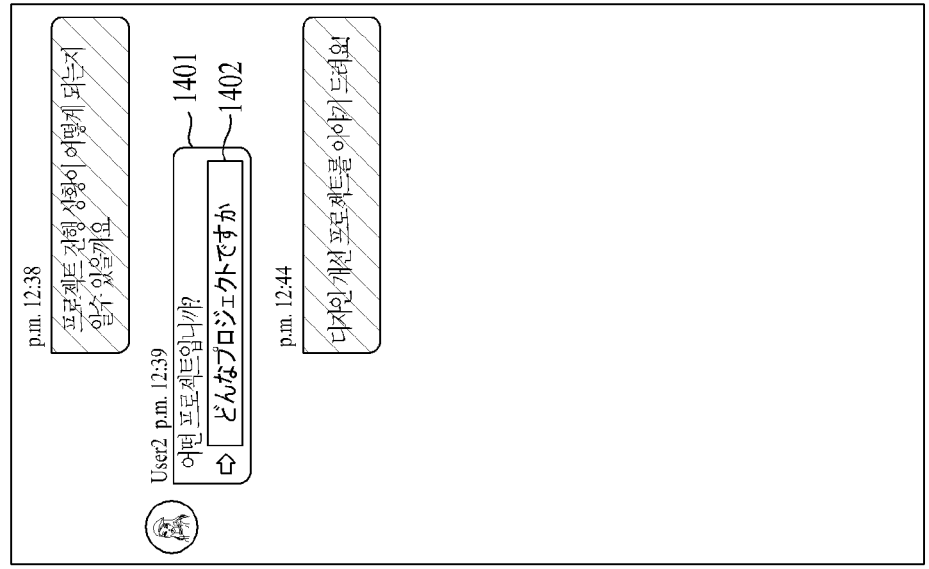
Figure 14:
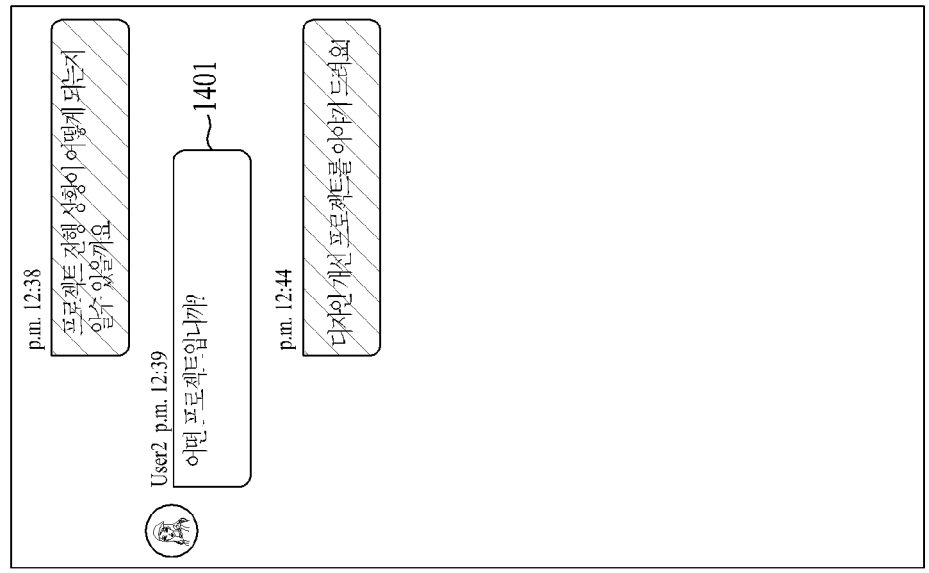

In response to a selection from the user of the electronic device 110 on conversation content of another user, that is, the counterpart speech balloon, the processor 212 may display the original text input from the counterpart in the language set by the counterpart together with the original language set by the user, as shown in FIG. 14.

Referring to FIG. 14, conversation content between the user 1 and the user 2 may be displayed as Korean texts on the translation tool screen 1200 on the electronic device of the user 1 having set Korean (KR) as the language used in the conference. Here, if the user 1 selects a speech balloon 1401 of the user 2, the original text 1402 input from the user 2 in Japanese (JP) may be displayed below the selected speech balloon 1401.

As another example, if the user of the electronic device 110 selects conversation content of another user, that is, a counterpart speech balloon, the processor 212 may further display a reference text translated in a reference language.

Figure 15:
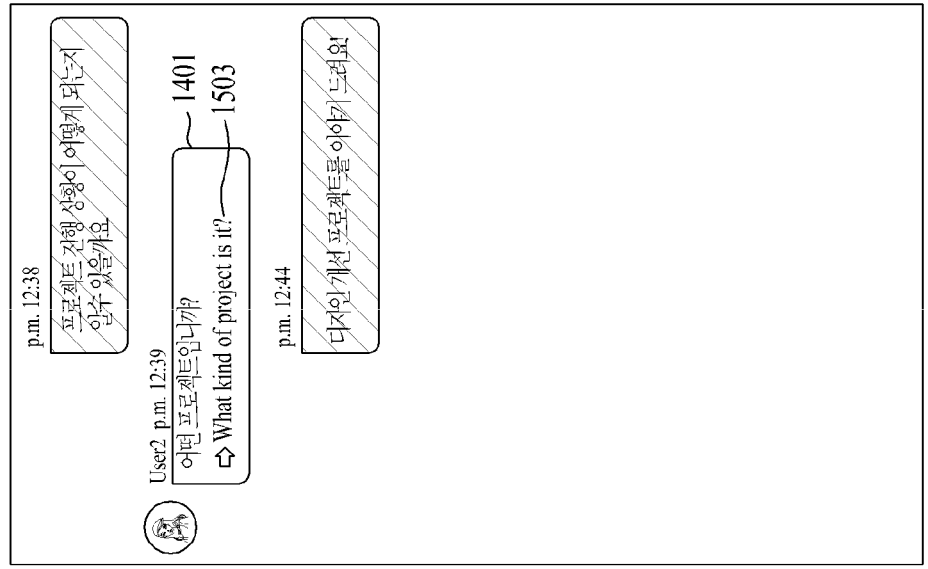
Figure 15:
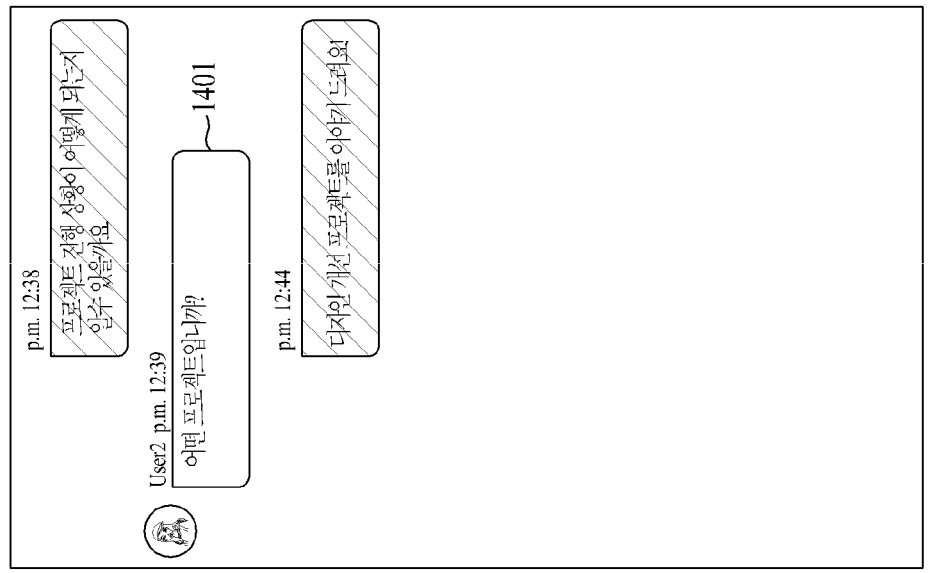

Referring to FIG. 15, conversation content between the user 1 and the user 2 may be displayed as Korean texts on the electronic device of the user 1 having set Korean (KR) as the language used in the conference. Here, if the user 1 selects the speech balloon 1401 of the user 2, a reference text 1503 translated in a reference language, that is, English (US) may be displayed below the selected speech balloon 1401.

As described above, according to example embodiments, it is possible to enhance convenience and expandability by using a basic mode for simultaneously displaying multilingual translation results and a subtitle mode for displaying translation results in a subtitle form through switching between the basic mode and the subtitle mode depending on necessity. Also, according to some example embodiments, it is possible to minimize an erroneous expression of opinion by occurrence of mistranslation by providing translation results of a main conference language together with translation results of a reference language. Also, according to some example embodiments, it is possible to provide an efficient conferencing environment by providing translation results in a subtitle form on another application screen and by using the translation results as a conference assistance tool.

The systems and/or apparatuses described herein may be implemented using hardware components such as a processing device, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the intended purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A translation providing method for providing real-time language translation during a video conference, implemented by a computer apparatus having at least one processor configured to execute computer-readable instructions included in a memory, the method comprising:
    setting a first language of a first user in a conference and a second language of a second user in the conference as conference languages;
    displaying, as a conference assistance tool, on a screen a basic mode including an original text input in the first language, a translation text that is translated from the original text in the second language, and a reference text translated from the original text or the translation text in a third language different from the first language and the second language;
    displaying on the screen a subtitle mode including the original text and the translation text without the reference text; and
    providing a switching user interface (UI) on the screen for switching a screen mode between the basic mode and the subtitle mode responsive to a selection of the switching UI by the first user or the second user.

2. The method of claim 1, wherein the original text and the translation text are displayed in a subtitle form in response to a selection of the subtitle mode using the switching UI.

3. The method of claim 1, wherein
    the original text is displayed to be distinguished from the translation text and the reference text.

4. The method of claim 1, wherein
    the original text, the translation text, and the reference text are sorted and displayed by a same language.

5. The method of claim 4, wherein the original text, the translation text, and the reference text are displayed together as a chat message for each user through a chatroom that includes a plurality of users participating in the conference; and
    texts corresponding to the language used by the first user are sorted to be in a first column.

6. The method of claim 1, wherein the subtitle mode is displayed on a subtitle mode screen including at least one of the switching UI for switching to the basic mode, a UI for fixing the subtitle mode screen to a foreground of the screen, a UI for adjusting a transparency of the subtitle mode screen, and a UI for adjusting a size of the subtitle mode screen.

7. The method of claim 1, wherein the original text and the translation text in the basic mode are displayed together as a chat message for each user through a chatroom that includes a plurality of users participating in the conference, and
    a modification UI for modifying a text with respect to the original text input from the first user is provided on the screen.

8. The method of claim 7, wherein, in a case the original text is modified through the modification UI, status information relating to the modification, instead of the original text, and the translation text that are not modified are displayed on the screen and, in response to a completion of the modification, the modified original text and the modified translation text are displayed on the screen.

9. The method of claim 1, wherein the original text and the translation text are displayed together as a chat message for each user through a chatroom that includes a plurality of users participating in the conference, and
    the translation providing method further comprises:
    recording a minutes document file that includes the chat message for each user.

10. The method of claim 9, wherein the recording of the minutes document file comprises selecting a text corresponding to a language selected by a user of the computer apparatus from among the plurality of languages and recording the minutes document file as the chat message for each user.

11. A non-transitory computer-readable recording medium storing computer instructions that, when executed by a processor, cause the processor to perform the translation providing method comprising:
    setting a first language of a first user in a conference and a second language of a second user in the conference as conference languages;
    displaying, as a conference assistance tool, on a screen a basic mode including an original text input in the first language, a translation text that is translated from the original text in the second language, and a reference text translated from the original text or the translation text in a third language different from the first language and the second language;
    displaying on the screen a subtitle mode including the original text and the translation text without the reference text; and
    providing a switching user interface (UI) on the screen for switching a screen mode between the basic mode and the subtitle mode responsive to a selection of the switching UI by the first user or the second user.

12. A computer apparatus comprising:
    at least one processor configured to execute computer-readable instructions included in a memory,
    wherein the at least one processor comprises:
    a translation display configured to set a first language of a first user in a conference and a second language of a second user in the conference as conference languages, display, as a conference assistance tool, on a screen a basic mode including an original text input in the first language, a translation text that is translated from the original text in the second language, and a reference text translated from the original text or the translation text in a third language different from the first language and the second language, and display on the screen a subtitle mode including the original text and the translation text without the reference text; and a screen switcher for switching a screen mode between the basic mode and the subtitle mode responsive to a selection of a switching user interface (UI) provided on the screen.

13. The computer apparatus of claim 12, wherein the original text and the translation text are displayed in a subtitle form in response to a selection of the subtitle mode using the switching UI.

14. The computer apparatus of claim 12, wherein the translation display is further configured to display the original text, the translation text and the reference text as a chat message for each user through a chatroom that includes a plurality of users participating in the conference, display the original text to be distinguished from the translation text and the reference text, and sort and display the original text, the translation text, and the reference text by a same language.

\* \* \* \* \*